United States Patent [19]
Herod et al.

[11] 3,719,162
[45] March 6, 1973

[54] SHIFT INDICATOR MECHANISM

[75] Inventors: Donald M. Herod, Davison, Mich.; Barry E. English, Luton, England

[73] Assignee: General Motors Corporation, Detroit, Mich.

[22] Filed: Oct. 26, 1970

[21] Appl. No.: 83,780

[52] U.S. Cl. ...................................116/124, 74/475
[51] Int. Cl. ...............................................G09f 9/00
[58] Field of Search..................116/124, 129, 115, 136.5, DIG. 6, 116/DIG. 20; 73/337, 337.5, 363.5; 74/483, 484, 475, 10.9

[56] References Cited

UNITED STATES PATENTS

| | | | |
|---|---|---|---|
| 2,909,067 | 10/1959 | Karlsruher | 74/10.9 |
| 2,925,061 | 2/1960 | Thornburgh et al. | 116/124 R |
| 3,015,951 | 1/1962 | Ochs, Jr. | 116/136.5 |
| 3,183,884 | 5/1965 | Daniels | 116/124 R |
| 3,602,187 | 8/1971 | Lambiris | 116/124 R |
| 3,608,377 | 9/1971 | Fenner | 73/337 |

*Primary Examiner*—Louis J. Capozi
*Attorney*—Warren E. Finken, A. M. Heiter and John P. Moran

[57] ABSTRACT

A one-piece shift indicator mechanism for an automotive instrument panel including a base member having a plurality of shift selector symbols formed thereon, a fixed abutment member formed on the base member adjacent an edge thereof, a shaped flexible spring member extending in a predetermined path from the fixed abutment member and terminating in a pointer, a stop member formed on the base member adjacent an edge thereof, the pointer being manually positionable against the stop member and movable to a position adjacent any one of the plurality of shift selector symbols in response to manually-actuated movement of the flexible spring member against the spring force thereof via a cable connected thereto from the conventional shift tube, the shaped flexible spring member having a plurality of bend portions formed therein so that the pointer may be moved relative to the abutment member, to cause the end of the pointer to follow a path which is symmetrical about the midpoint of the shift selector symbols.

6 Claims, 3 Drawing Figures

PATENTED MAR 6 1973

3,719,162

INVENTORS
Donald M. Herod &
BY Barry E. English

John P. Moran
ATTORNEY

SHIFT INDICATOR MECHANISM

This invention relates to automotive shift indicator mechanisms for automotive instrument panels and more specifically to a one-piece shift indicator mechanism therefor.

Automotive shift indicator mechanisms to date have embodied a multipiece assembly, generally including an injection molded base, a pointer pivotable about a pin mounted on the base, and a helical spring urging the return of the pointer.

Where there is a need, the invention proposed hereinafter provides a one-piece injection molded part which incorporates all the functions of the above plurality of components.

Accordingly, an object of the invention is to provide a one-piece shift indicator mechanism having a base portion, a pointer portion and an interconnecting flexible portion integrally formed by injection molding.

Another object of the invention is to provide a one-piece shift indicator mechanism wherein the integrally molded flexible portion is such that it permits proper movement of the pointer when the latter is actuated by a conventional cable or other linkage attached thereto, and provides adequate restoring force for return motion with sufficient fatigue strength to withstand the numerous cycles completed during the normal operating life thereof.

A further object of the invention is to provide a one-piece shift indicator mechanism capable of: (1) more efficient performance due to the elimination of sliding and/or rotating friction; (2) longer operational life and increased reliability due to elimination of wear and potential sticking; and (3) increased design versatility due to the various configurations available for the interconnecting spring portion.

These and other objects and advantages of the invention will become apparent when reference is made to the following description and accompanying drawings, wherein.

Figure 1:
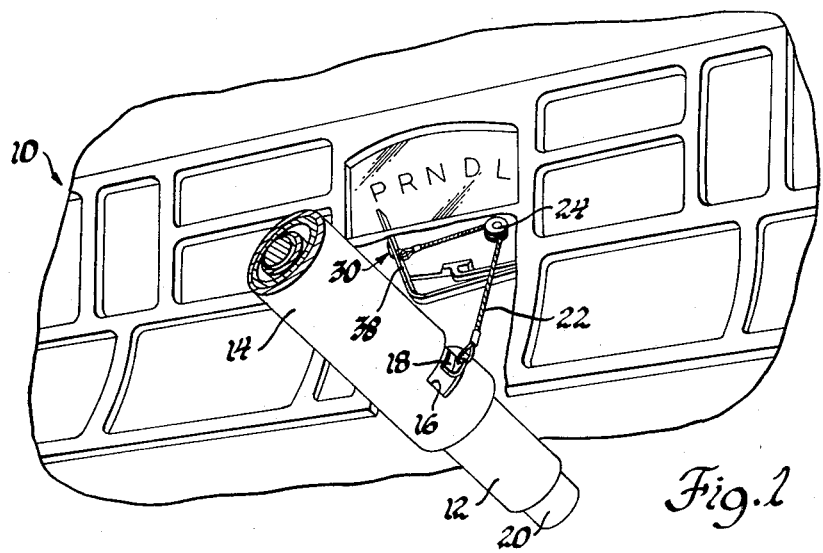
FIG. 1 is a perspective view illustrating a vehicular instrument panel embodying the invention.

Referring now to the drawings in greater detail, FIG. 1 illustrates a conventional vehicular instrument panel 10 and an associated steering column 12, the latter having a mast jacket 14 mounted thereon and including a slot or opening 16 providing access through the mast jacket 14 and the steering column 12 to a small bracket 18 formed on an interior, axially extending shift tube 20. A cable 22 is connected at one end thereof to the bracket 18 and extends upwardly therefrom around a pulley or other suitable pivoting arrangement 24. The cable 22 is connected at its other end to an eyelet connection opening 26 of a tab 28 formed on a shift indicator mechanism 30. As better seen in FIG. 2, the shift indicator mechanism 30 further includes a base 32 having a stop member 34 formed thereon. A plurality of shift selector symbols 36 are formed or inscribed at predetermined points on the base 32. A pointer 38 is formed on the end of a flexible spring member 40 extending in a predetermined shaped manner from the base 32.

Figure 2:
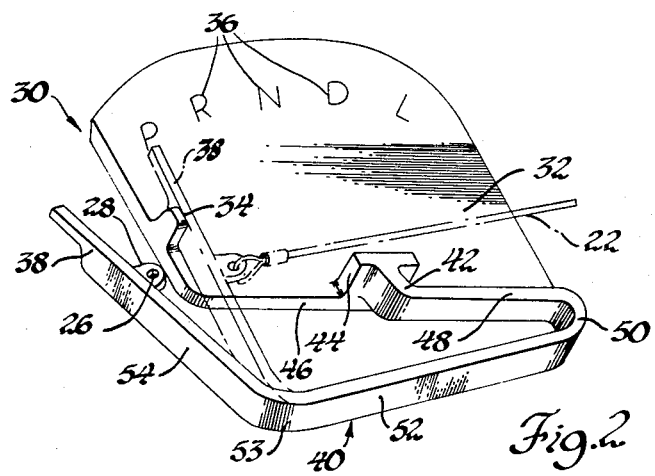
FIG. 2 is a perspective view of a one-piece shift indicator mechanism in accordance with the invention.

As illustrated in FIG. 2, the flexible spring member 40 may include a connector portion 42 extending outwardly from a fixed abutment 44 formed adjacent a lower edge 46 of the base 32. A rightwardly extending straight portion 48 extends from the connector portion 42. A bend portion 50 connects the straight portion 48 to another straight portion 52 extending at a predetermined angle relative thereto. Another bend portion 53 and an upwardly and leftwardly extending straight portion 54 extend from the portion 52, the portion 54 having the pointer 38 formed on the end thereof. The interrelationship of the flexible spring member 40 components is such that portions thereof may be moved by pulling on the cable 22 to cause the end of the pointer 38 to follow a path of travel which is symmetrical about the midpoint of the shift selector symbols 36.

Figure 3:
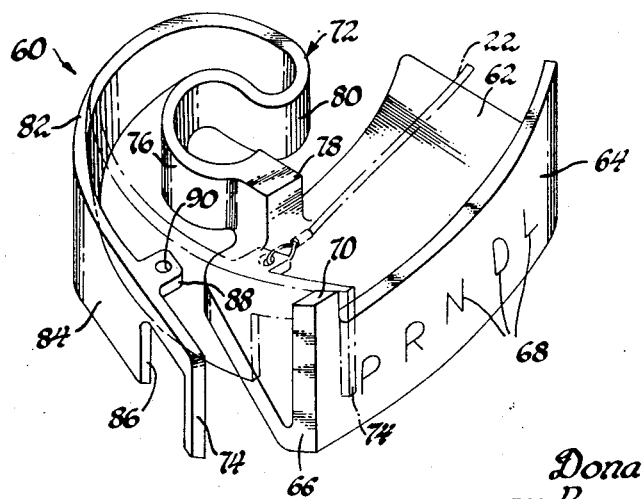
FIG. 3 is a perspective view of a second embodiment of the invention.

Referring now to FIG. 3, a second embodiment of a one-piece shift indicator mechanism 60 includes a base 62 having a wall member 64 formed adjacent the front edge 66 thereof. The usual shift selector symbols 68 are formed on the front face of the wall member 64, and a stop member 70 is formed on the upper left edge thereof.

A shaped flexible spring member 72 extends from the base 62 and terminates in a pointer 74. A first arcuate portion 76 of the spring member 72 extends from a fixed abutment 78 formed on the base 62. A second arcuate portion 80 connects with the first arcuate portion 76 and blends into a third arcuate portion 82. A straight end portion 84 is formed on the third arcuate portion 82. A notch 86 is formed in the straight end portion 84, with the pointer 74 forming one side thereof. The sides of the notch 86 are adapted to straddle the wall member 64 so that the pointer 74 may be moved to a position in front of any one of the symbols 68. A tab 88, including an eyelet connection opening 90 for the cable 22, is formed on the right side of the straight portion 84 adjacent the upper edge thereof. The reverse bend arrangement is such that pulling the cable 22 will move the pointer 74 along a path of travel in front of the symbols 68 formed on the wall member 64.

OPERATION

It should first be realized that the assembled positions of the straight portions 54 and 84 of the flexible spring members 40 and 72, respectively, are to the right (FIGS. 2 and 3) of the respective stop members 34 and 70, the unbroken line portions of FIGS. 2 and 3 illustrating the free state of the indicator mechanisms 30 and 60. The inherent spring force of the flexible spring members 40 and 70 is such that the portions 54 and 84 are urged leftwardly in the Figures, against the respective stop members 34 and 70, with the respective pointers 38 and 74 positioned in front of or adjacent the "PARK" or "P" symbol.

It is apparent then that suitable connector means, such as the cable 22 and the pulley 24 arrangement illustrated in FIG. 1, would, in response to manual rotary actuation of the shift tube 20, via a conventional shift selector lever (not shown), cause the pointer 38 or 74 to be pulled to the right to the desired "REVERSE" ("R", "NEUTRAL" ("N"), "DRIVE" ("D"), or "LOW" ("L") indicator positions, indicating the particular drive ratios which will have been correspondingly actuated in the transmission (not shown). The particular paths of travel of the ends of the pointers 38 and 74 are, of course, coordinated with the lateral lineup of the respective rows of symbols 36 and 68. Once released, the spring force in the flexible spring members 40 and 72 will return the respective pointers 38 and 74 to their "PARK" ("P") positions adjacent the respective stop members 34 and 70.

It should be apparent that the invention provides a simplified one-piece shift indicator mechanism which is adapted to economical manufacture and assembly, capable of efficient performance and long operational life due to the elimination of sliding and/or rotating friction and the resultant wear and potential sticking, and suitable for increased design versatility due to various configurations available for the spring portion thereof.

It should be further apparent that while but two embodiments of the invention have been described and illustrated, featuring two differently shaped base, flexible member and pointer combinations, other shapes, suitable for various automotive dashboard applications, are possible.

We claim:

1. A shift indicator mechanism comprising a base member, a plurality of shift selector symbols formed thereon, a fixed abutment member formed on said base member adjacent an edge thereof, a shaped flexible spring member operatively connected to and extending in a predetermined path from said fixed abutment member, a pointer member formed on the free end of said shaped flexible spring member, a stop member formed on said base member adjacent an edge thereof, said pointer member being urged toward said stop member by said flexible spring member, and means operatively connected to said pointer member for selectively moving said pointer member to a position adjacent any one of said plurality of shift selector symbols against the spring force of said shaped flexible spring member.

2. A shift indicator mechanism comprising a base member, a plurality of shift selector symbols formed thereon, a fixed abutment member formed on said base member adjacent an edge thereof, a stop member formed on said base member adjacent an edge thereof, a shaped flexible spring member operatively connected at one end thereof to said fixed abutment member and having a plurality of interconnected differently directed portions extending in a predetermined path from said fixed abutment member, a pointer member formed on the free end of said interconnected portions of said shaped flexible spring member, connector means formed adjacent said free end and suitable for the connection thereto of an actuating member, and an actuating member connected to said connector means, said pointer member being urged toward a side of said stop member by said flexible spring member and movable to a position adjacent any one of said plurality of shift selector symbols in response to movement of said interconnected portions of said shaped flexible spring member against the spring force thereof upon selective movement of said actuating member away from said stop member.

3. For use with an automotive instrument panel and rotatable shift tube, a shift indicator mechanism comprising a base member, a plurality of shift selector symbols formed thereon, a fixed abutment member formed on said base member adjacent an edge thereof, a stop member formed on said base member adjacent an edge thereof, a shaped flexible spring member operatively connected to and extending in a predetermined path from said fixed abutment member, a pointer member formed on the free end of said shaped flexible spring member, a connector member formed on said shaped flexible spring member adjacent said pointer member, and connector means interconnecting said connector member and said shift tube, said pointer member being urged toward a side of said stop member by said flexible spring member and movable to a position adjacent any one of said plurality of shift selector symbols in response to movement of said shaped flexible spring member against the spring force thereof resulting from selective manually actuated movement of said shift tube.

4. For use with a vehicular transmission and a shift tube operatively connected to said transmission, a shift indicator mechanism comprising a base member, a plurality of shift selector symbols formed thereon, a fixed abutment member formed on said base member adjacent an edge thereof, a stop member formed on said base member adjacent an edge thereof, a shaped flexible spring member connected at one end thereof to and extending in a predetermined path from said fixed abutment member, a pointer member formed on the free end of said shaped flexible spring member, a connector member formed on said shaped flexible spring member adjacent said pointer member, and cable means operatively connected between said shift tube and said connector member, said pointer member being urged toward a side of said stop member by said flexible spring member and movable to a position adjacent any one of said plurality of shift selector symbols in response to movement of said shaped flexible spring member against the spring force thereof resulting from selective manually actuated movement of said shift tube.

5. For use with an actuating cable, a one-piece shift indicator mechanism comprising a base member, a plurality of shift selector symbols formed thereon, a fixed abutment member formed on said base member adjacent an edge thereof, a shaped flexible spring member connected at one end thereof to and extending from said fixed abutment member, said shaped flexible spring member including a first straight portion extending from said fixed abutment member, a second straight portion substantially parallel to said first straight portion, a curved portion interconnecting adjacent ends of said first and second straight portions, a third straight portion extending from the other end of said second straight portion, a pointer member formed on the free end of said third straight portion, connector means formed adjacent said free end and suitable for the connection thereto of said actuating cable, and a stop member formed on said base member adjacent an edge thereof, said pointer member being urged toward said stop member by said spring member and selectively movable to a position adjacent any one of said plurality of shift selector symbols in response to movement of said shaped flexible spring member against the spring force thereof upon movement of said actuating cable away from said stop member.

6. For use with an actuating cable, a one-piece shift indicator mechanism comprising a base member, a plurality of shift selector symbols formed thereon, a fixed abutment member formed on said base member adjacent on edge thereof, a shaped flexible spring member connected at one end thereof to and extending from said fixed abutment member, said shaped flexible spring member including a first curved portion extending from said fixed abutment member, a second curved portion extending from the end of said first curved portion, a third curved portion extending from the end of said second curved portion, a straight portion extending from the end of said third curved portion, a pointer member formed on the free end of said straight portion, connector means formed adjacent said free end and suitable for the connection thereto of said actuating cable, and a stop member formed on said base member adjacent an edge thereof, said pointer member being urged toward said stop member by said spring member and selectively movable to a position adjacent any one of said plurality of shift selector symbols in response to movement of said shaped flexible spring member against the spring force thereof upon movement of said actuating cable away from said stop member.

* * * * *